US010385808B2

(12) United States Patent
Chen

(10) Patent No.: US 10,385,808 B2
(45) Date of Patent: Aug. 20, 2019

(54) NANOMETER FILM-INSTALLED FUEL TANK CAP WITH CHARCOAL CANISTER

(71) Applicant: Daoju Chen, Chongqing (CN)

(72) Inventor: Daoju Chen, Chongqing (CN)

( * ) Notice: Subject to any disclaimer, the term of this patent is extended or adjusted under 35 U.S.C. 154(b) by 0 days.

(21) Appl. No.: 15/961,735

(22) Filed: Apr. 24, 2018

(65) Prior Publication Data
US 2018/0347513 A1 Dec. 6, 2018

(30) Foreign Application Priority Data

Jun. 1, 2017 (CN) .................... 2017 2 0626457 U

(51) Int. Cl.
*F02M 25/00* (2006.01)
*F02M 25/08* (2006.01)
*C08J 5/00* (2006.01)
*B60K 15/04* (2006.01)
*B32B 27/00* (2006.01)

(52) U.S. Cl.
CPC ......... *F02M 25/0854* (2013.01); *B32B 27/00* (2013.01); *B60K 15/0406* (2013.01); *C08J 5/005* (2013.01); *B01D 2253/102* (2013.01)

(58) Field of Classification Search
CPC .............. F02M 25/0854; B32B 27/00; B01D 2253/102; B60K 15/0406; C08J 5/005
See application file for complete search history.

(56) References Cited

U.S. PATENT DOCUMENTS

| 2003/0234254 | A1* | 12/2003 | Grybush | .............. | A01D 34/001 220/366.1 |
| 2004/0094554 | A1* | 5/2004 | Grybush | .............. | A01D 34/001 220/366.1 |
| 2006/0266338 | A1* | 11/2006 | Kashima | .......... | B60K 15/03504 123/519 |
| 2014/0117015 | A1* | 5/2014 | Kraus | .................... | B60K 13/04 220/86.1 |

* cited by examiner

*Primary Examiner* — Hieu T Vo
*Assistant Examiner* — Sherman D Manley
(74) *Attorney, Agent, or Firm* — Craft Chu PLLC; Andrew W. Chu

(57) ABSTRACT

The nanometer film-installed fuel tank cap with charcoal canister includes a fuel tank outer cap and a fuel tank inner cap. A filling chamber is disposed in the center of the fuel tank inner cap and is provided inside with fuel-adsorbing filler. The fuel tank outer cap wraps up the upper port of the filling chamber. The fuel tank inner cap has a volume chamber at the bottom, and the volume chamber has a vent cap at the top. Between the side wall of the vent cap and the inner wall of the volume chamber, there is an air gap. The volume chamber has a vent hole. The internal bottom surface has a nanometer film module used to cover the vent hole. The nanometer film module covers the vent hole on the internal bottom surface, such that the fuel entering the volume chamber via the vent hole can be filtered.

10 Claims, 2 Drawing Sheets

NANOMETER FILM-INSTALLED FUEL TANK CAP WITH CHARCOAL CANISTER

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The utility model relates to the technical field of fuel tank components and equipment, and, more particularly, to a nanometer film-installed fuel tank cap with charcoal canister.

2. Description of Related Art Including Information Disclosed Under 37 CFR 1.97 and 37 CFR 1.98

In the design of most fuel tank caps available on the market, an inner chamber is filled up with carbon powder; when the pressure in the fuel tank exceeds external pressure, the fuel gas in the fuel tank is emitted into the external environment via the carbon powder chamber to achieve a balance of internal and external pressure; when the fuel gas passes through the carbon powder chamber, it is partially received by the carbon powder, and the filtered gas is emitted into the external environment to realize the goals of controlling fuel emission and reducing contamination. Existing fuel tank caps with charcoal canister can only realize the partial adsorption of the fuel gas by the carbon powder; when the fuel tank is overheated or vibrates excessively, a little fuel will enter the carbon chamber and soak the carbon powder; as time passes, the carbon powder will lose its adsorptive effect or its adsorptive effect will be weakened.

BRIEF SUMMARY OF THE INVENTION

The technical problem to be solved by the utility model is to provide a structurally-simple nanometer film-installed fuel tank cap with charcoal canister that can reduce the fuel entering the charcoal canister and extend the service life of the carbon powder in the charcoal canister.

The technical scheme proposed by the present invention to solve the above technical problem is: a nanometer film-installed fuel tank cap with charcoal canister, which includes a fuel tank outer cap and a fuel tank inner cap, wherein, a filling chamber is disposed in the center of the said fuel tank inner cap; the said filling chamber is provided inside with fuel-adsorbing filler; the said fuel tank outer cap is designed above the said fuel tank inner cap, and the said fuel tank outer cap wraps up the upper port of the said filling chamber; the said fuel tank inner cap is designed with a volume chamber at the bottom and below the said filling chamber; the said volume chamber has a vent cap at the top, used to isolate the said volume chamber and the said filling chamber; between the side wall of the said vent cap and the inner wall of the said volume chamber there is an air gap, which makes convenience for guiding the fuel in the said volume chamber into the said filling chamber; the said volume chamber has a vent hole at the bottom, via which the volatilized fuel in the fuel tank is guided into the said volume chamber; the internal bottom surface of the said volume chamber is designed with a nanometer film module used to cover the said vent hole.

The beneficial effect of the present invention is that: Through designing a nanometer film module used to cover the said vent hole on the internal bottom surface of the said volume chamber, the fuel entering the volume chamber via the vent hole can be filtered, so as to reduce the fuel content in the fuel gas and thus reduce the fuel entering the fuel-adsorbing filler and further improve the service life of the fuel-adsorbing filler.

Based on the above technical scheme, the utility model can also be improved as follows.

Furthermore, the said nanometer film module consists of a high-elasticity polyester layer and a PTFE microporous film (that is, polytetrafluoroethylene microporous film in original fibrous microporous structure, with a porosity of above 85% and 1.4 billion micropores/cm2), wherein the said high-elasticity polyester layer is set between the said PTFE microporous film and the internal bottom of the said volume chamber.

The beneficial effect of adopting the above further scheme is that: Through first attaching the PTFE microporous film to the high-elasticity polyester layer and then attaching the high-elasticity polyester layer to the internal bottom of the volume chamber, the defect of infirm attachment when the PTFE microporous film is separately attached can be avoided.

Furthermore, the micropores on the said PTFE microporous film have a diameter of 300 nm~500 nm.

The beneficial effect of adopting the above further scheme is that: Given that air and water vapor molecules generally have a diameter of 100~300 nm and that liquid water (including fuel) has a clustering property, with a molecular diameter of about 1,000 nm, the micropores on the PTFE microporous film are set with a diameter of 300 nm~500 nm, so that, under the premise of allowing air and water vapor molecules to pass through, they can block the fuel.

Furthermore, the said PTFE microporous film has a thickness of 20~30 um.

Furthermore, the said PTFE microporous film has an air permeability of 20~30 mm/s.

Furthermore, the said PTFE microporous film has a stillwater-fast pressure of greater than or equal to 60 kPa.

The beneficial effect of adopting the above further scheme is that: In actual service, when the gasoline engine stops and the fuel tank produces a negative pressure, the PTFE microporous film has a stillwater-fast pressure of greater than or equal to 60 kPa, thus protecting the PTFE microporous film against damage under negative pressure.

Furthermore, the upper surface of the said vent cap is configured with a lower breathing panel that covers the said air gap, and the said fuel-adsorbing filler is set above the said lower breathing panel.

The beneficial effect of adopting the above further scheme is that: The setting of the lower breathing panel can filter the fuel entering the fuel tank cap again, and thus reduce fuel adsorption by the fuel-adsorbing filler and further improve the service life of the fuel-adsorbing filler.

Furthermore, it also includes an upper breathing panel covering the top of the said fuel-adsorbing filler, wherein the said upper breathing panel is set at the upper port of the said filling chamber.

The beneficial effect of adopting the above further scheme is that: The setting of the upper breathing panel can prevent the fuel-adsorbing filler from leaking out through the gap between the fuel tank outer cap and the fuel tank inner cap.

Furthermore, it also includes an inner deck covering the upper port of the said filling chamber, wherein the said inner deck is designed with several upper vent holes.

The beneficial effect of adopting the above further scheme is that: The setting of the inner deck can enhance the role of preventing the fuel-adsorbing filler from leaking out.

Furthermore, the said fuel tank inner cap is installed at the bottom with a removable hook.

Furthermore, the top of the said hook is clamped with the bottom of the said fuel tank inner cap in the center.

The beneficial effect of adopting the above further scheme is that: Adopting removable connection between the hook and the fuel tank inner cap through clamping makes convenience for the installation of the hook.

Figure 1:
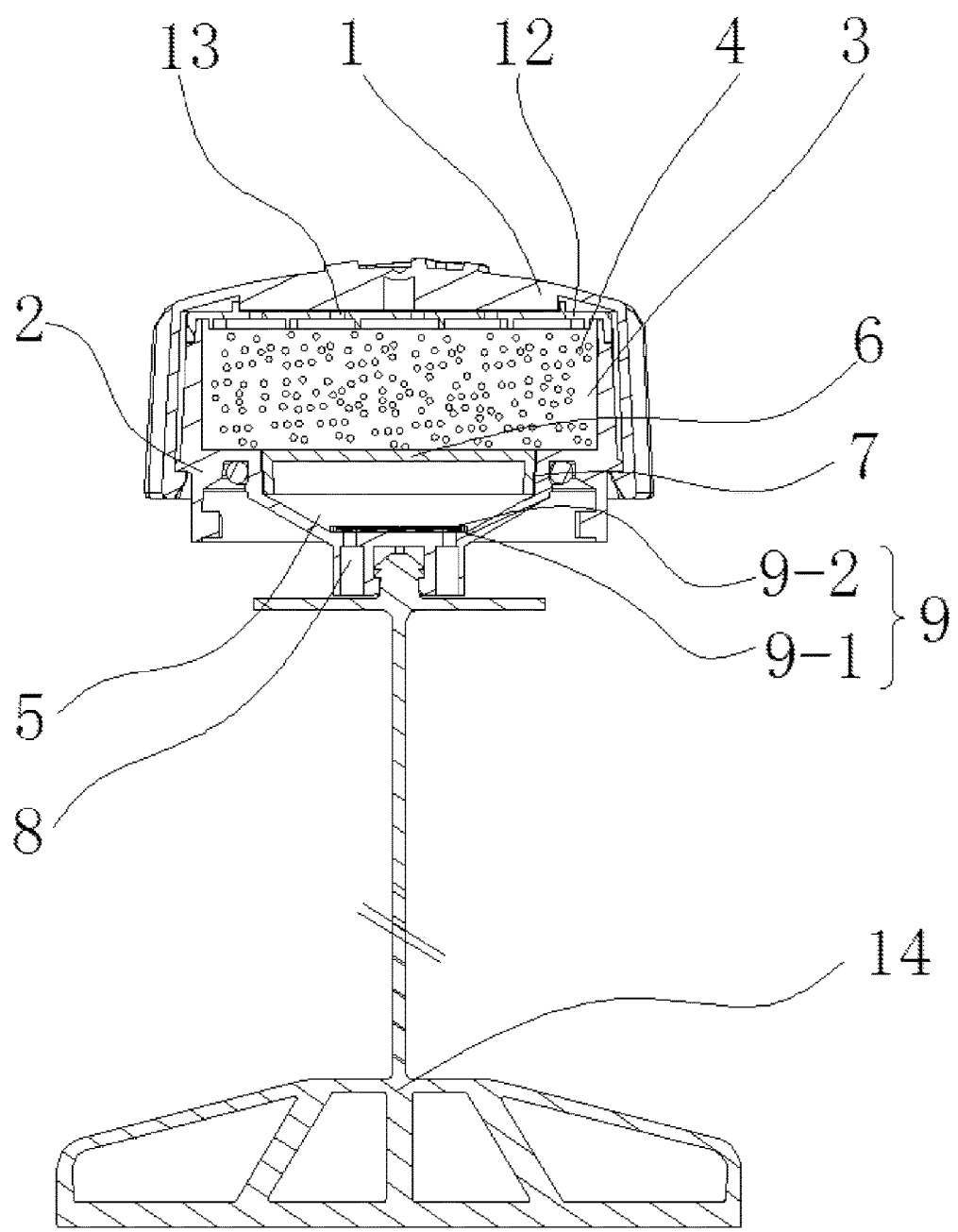
FIG. 1 provides a sectional view of the structural diagram of the first embodiment of the utility model.

The components represented by figures in the drawings are listed below:

1: fuel tank outer cap; 2: fuel tank inner cap; 3: filling chamber; 4: fuel-adsorbing filler; 5: volume chamber; 6: vent cap; 7: air gap; 8: vent hole; 9: nanometer film module; 9-1: high-elasticity polyester layer; 9-2: PTFE microporous film; 10: lower breathing panel; 11: upper breathing panel; 12: inner deck; 13: vent hole; 14: hook.

DETAILED DESCRIPTION OF THE INVENTION

Drawings are used in combination to describe the principles and characteristics of the utility model; the embodiments cited are intended only to illustrate and not to limit the scope of the present invention.

Embodiment I

As shown in FIG. 1, the embodiment includes a fuel tank outer cap 1 and a fuel tank inner cap 2, wherein, a filling chamber 3 with upper opening is disposed in the center of the said fuel tank inner cap 2; the said filling chamber 3 is provided inside with fuel-adsorbing filler 4; the said fuel tank outer cap 1 is designed above the said fuel tank inner cap 2, and the said fuel tank outer cap 1 wraps up the upper port of the said filling chamber 3; the said fuel tank inner cap 2 is designed with a volume chamber 5 at the bottom and below the said filling chamber 3; the said volume chamber 5 has a vent cap 6 at the top, used to isolate the said volume chamber 5 and the said filling chamber 3; between the side wall of the said vent cap 6 and the inner wall of the said volume chamber 5 there is an air gap 7, which makes convenience for guiding the fuel in the said volume chamber 5 into the said filling chamber 3; the said volume chamber 5 has a vent hole 8 at the bottom, via which the volatilized fuel in the fuel tank is guided into the said volume chamber 5; the internal bottom surface of the said volume chamber 5 is designed with a nanometer film module 9 used to cover the said vent hole 8.

The said nanometer film module 9 consists of a high-elasticity polyester layer 9-1 and a PTFE microporous film 9-2, wherein the said high-elasticity polyester layer 9-1 is set between the said PTFE microporous film 9-2 and the internal bottom of the said volume chamber 5. Through first attaching the PTFE microporous film 9-2 to the high-elasticity polyester layer 9-1 and then attaching the high-elasticity polyester layer 9-1 to the internal bottom of the volume chamber 5, the defect of infirm attachment when the PTFE microporous film 9-2 is separately attached can be avoided. In the embodiment, the PTFE microporous film 9-2 adopted has the following characteristics: (1) a thickness of 20~30 um, guaranteeing sufficient strength; (2) a porosity of above 75%, guaranteeing filtering efficiency; (3) a thermal stability temperature range of −100°-300°, guaranteeing the ability of the PTFE microporous film 9-2 to withstand both low and high temperatures; (4) an air permeability of 20~30 mm/s, guaranteeing air permeation efficiency; (5) stillwater-fast pressure greater than or equal to 60 kPa: In actual service, when the gasoline engine stops and the fuel tank produces a negative pressure, the PTFE microporous film 9-2 has a stillwater-fast pressure of greater than or equal to 60 kPa, thus protecting the PTFE microporous film 9-2 against damage under negative pressure.

Embodiment II

Figure 2:
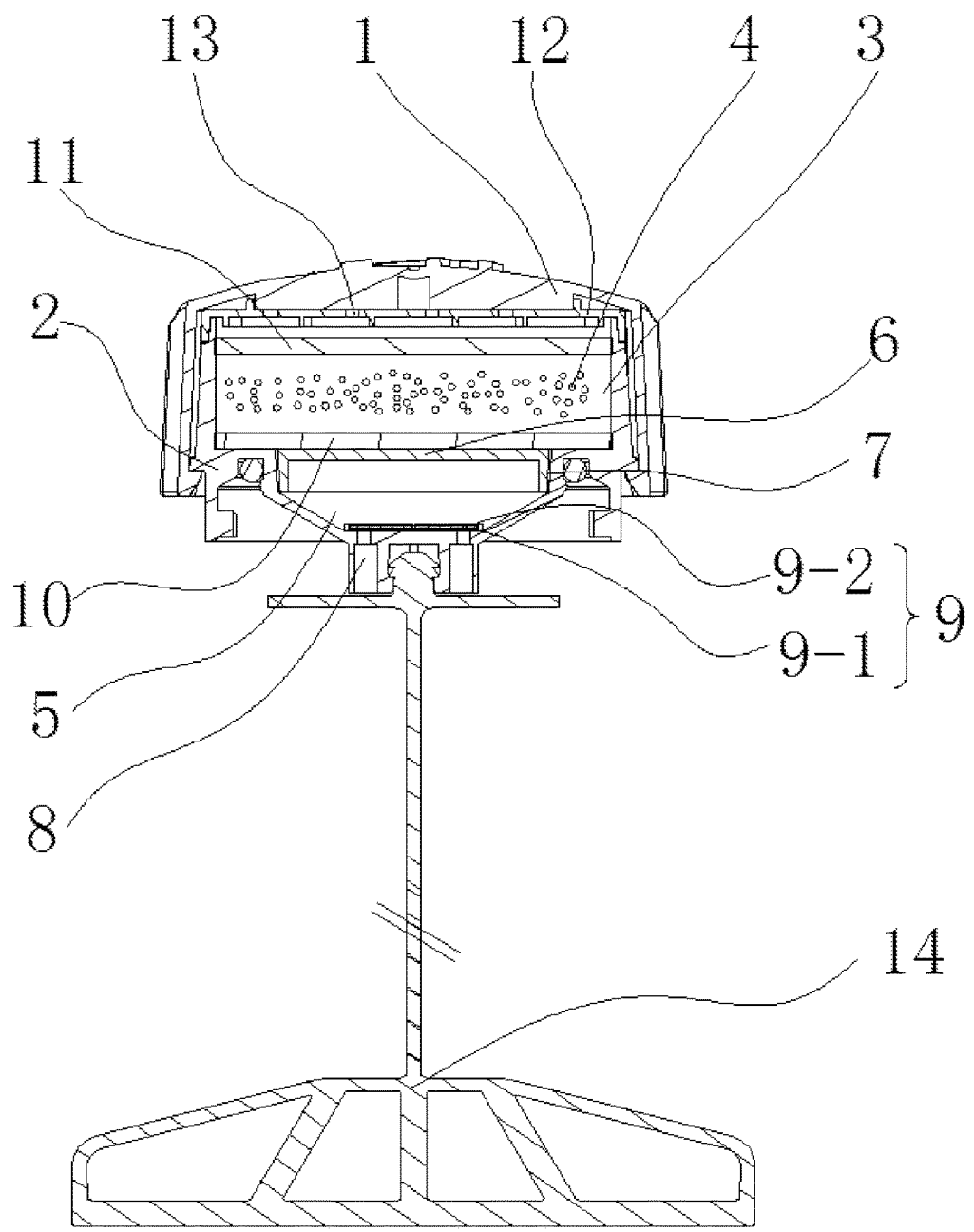
FIG. 2 provides a sectional view of the structural diagram of the second embodiment of the utility model.

As shown in FIG. 2, the embodiment includes a fuel tank outer cap 1 and a fuel tank inner cap 2, wherein, a filling chamber 3 with upper opening is disposed in the center of the said fuel tank inner cap 2; the said filling chamber 3 is provided inside with fuel-adsorbing filler 4; the said fuel tank outer cap 1 is designed above the said fuel tank inner cap 2, and the said fuel tank outer cap 1 wraps up the upper port of the said filling chamber 3; the said fuel tank inner cap 2 is designed with a volume chamber 5 at the bottom and below the said filling chamber 3; the said volume chamber 5 has a vent cap 6 at the top, used to isolate the said volume chamber 5 and the said filling chamber 3; between the side wall of the said vent cap 6 and the inner wall of the said volume chamber 5 there is an air gap 7, which makes convenience for guiding the fuel in the said volume chamber 5 into the said filling chamber 3; the said volume chamber 5 has a vent hole 8 at the bottom, via which the volatilized fuel in the fuel tank is guided into the said volume chamber 5; the internal bottom surface of the said volume chamber 5 is designed with a nanometer film module 9 used to cover the said vent hole 8. The said nanometer film module 9 consists of a high-elasticity polyester layer 9-1 and a PTFE microporous film 9-2, wherein the said high-elasticity polyester layer 9-1 is set between the said PTFE microporous film 9-2 and the internal bottom of the said volume chamber 5. Through first attaching the PTFE microporous film 9-2 to the high-elasticity polyester layer 9-1 and then attaching the high-elasticity polyester layer 9-1 to the internal bottom of the volume chamber 5, the defect of infirm attachment when the PTFE microporous film 9-2 is separately attached can be avoided.

In the embodiment, the PTFE microporous film 9-2 adopted has the following characteristics: (1) a thickness of 20~30 um, guaranteeing sufficient strength; (2) a porosity of above 75%, guaranteeing filtering efficiency; (3) a thermal stability temperature range of −100°-300°, guaranteeing the ability of the PTFE microporous film 9-2 to withstand both low and high temperatures; (4) an air permeability of 20~30 mm/s, guaranteeing air permeation efficiency; (5) stillwater-fast pressure greater than or equal to 60 kPa: In actual service, when the gasoline engine stops and the fuel tank produces a negative pressure, the PTFE microporous film 9-2 has a stillwater-fast pressure of greater than or equal to 60 kPa, thus protecting the PTFE microporous film 9-2 against damage under negative pressure.

In the embodiment, the upper surface of the said vent cap 6 is configured with a lower breathing panel 10 that covers the said air gap 7, and the said fuel-adsorbing filler 4 is set above the said lower breathing panel 10. The setting of the lower breathing panel 10 can filter the fuel entering the fuel tank cap again, and thus reduce fuel adsorption by the fuel-adsorbing filler 4 and further improve the service life of the fuel-adsorbing filler 4. It also includes an upper breathing panel 11 covering the top of the said fuel-adsorbing filler 4, wherein the said upper breathing panel 11 is set at the upper port of the said filling chamber 3. The setting of the upper breathing panel 11 can prevent the fuel-adsorbing filler 4 from leaking out through the gap between the fuel tank outer cap 1 and the fuel tank inner cap 2. It also includes an inner deck 12 covering the upper port of the said filling chamber 3, wherein the said inner deck 12 is designed with several upper vent holes (13). The setting of the inner deck 12 can enhance the role of preventing the fuel-adsorbing filler 4 from leaking out. The said fuel tank inner cap 2 is installed at the bottom with a removable hook 14. The top of the said hook 14 is clamped with the bottom of the said fuel tank inner cap 2 in the center. Adopting removable connection between the hook 14 and the fuel tank inner cap 2 through clamping makes convenience for the installation of the hook 14.

Working principle: In the service process, when the fuel tank is overheated or vibrates excessively, a little fuel will enter the vent hole. Through designing a nanometer film module 9 used to cover the said vent hole 8 on the internal bottom surface of the said volume chamber 5, the fuel entering the volume chamber 5 via the vent hole 8 can be filtered, so as to reduce the fuel content in the fuel gas; the fuel entering the volume chamber 5 via the nanometer film module 9 then passes through the gap between the vent cap 6 and the volume chamber 5, after which the fuel is partially adsorbed onto the inner wall of the volume chamber 5 and partially guided through the lower breathing panel 10; filtered by the lower breathing panel 10, the fuel content in the fuel gas is reduced again before entering the fuel-adsorbing filler 4; the common fuel-adsorbing filler 4 is carbon powder, and, after being adsorbed by carbon powder, the fuel further passes through the upper breathing panel 11 and the inner deck 12 before being ultimately emitted outside.

Given that air and water vapor molecules generally have a diameter of 100~300 nm and that liquid water (including fuel) has a clustering property, with a molecular diameter of about 1,000 nm, the micropores on the PTFE microporous film 9-2 in the nanometer film module 9 are set with a diameter of 300 nm~500 nm, so that, under the premise of allowing air and water vapor molecules to pass through, they can block the fuel. In this way, the present invention can filter the fuel entering the volume chamber 5 via the vent hole 8, reduce the fuel content in the fuel gas and thus reduce the fuel entering the fuel-adsorbing filler 4 and further improve the service life of the fuel-adsorbing filler 4.

Described above are only two preferred embodiments of the utility model, which are not intended to limit the utility model. Any and all amendments, adoption by equation, improvements and so forth made in the spirit or principles of the utility model shall be covered by the scope of protection of the utility model.

I claim:

1. A nanometer film-installed fuel tank cap with charcoal canister, the fuel tank cap comprising:
    a fuel tank outer cap: and
    a fuel tank inner cap,
    wherein a filling chamber with upper opening is disposed in the center of said fuel tank inner cap,
    wherein said filling chamber is provided inside with fuel-adsorbing filler,
    wherein said fuel tank outer cap is above said fuel tank inner cap,
    wherein said fuel tank outer cap wraps up the upper port of said filling chamber,
    wherein said fuel tank inner cap has a volume chamber at the bottom and below said filling chamber,
    wherein said volume chamber has a vent cap at the top, used to isolate said volume chamber and said filling chamber,
    wherein, between the side wall of said vent cap and the inner wall of said volume chamber, an air gap guides fuel in said volume chamber into said filling chamber,
    wherein said volume chamber has a vent hole at the bottom, via which volatilized fuel in the fuel tank is guided into said volume chamber, and
    wherein the internal bottom surface of said volume chamber is comprised of a nanometer film module so as to cover said vent hole.

2. A The nanometer film-installed fuel tank cap with charcoal canister according to claim 1, wherein said nanometer film module is comprised of a high-elasticity polyester layer and a PTFE microporous film, and wherein said high-elasticity polyester layer is set between said PTFE microporous film and the internal bottom of said volume chamber.

3. The nanometer film-installed fuel tank cap with charcoal canister according to claim 2, wherein micropores on said PTFE microporous film have a diameter of 300 nm~500 nm.

4. The nanometer film-installed fuel tank cap with charcoal canister according to claim 2, wherein said PTFE microporous film has a thickness of 20~30 um.

5. The nanometer film-installed fuel tank cap with charcoal canister according to claim 2, wherein said PTFE microporous film has an air permeability of 20~30 mm/s.

6. The nanometer film-installed fuel tank cap with charcoal canister according to claim 2, wherein said PTFE microporous film has a stillwater-fast pressure of greater than or equal to 60 kPa.

7. The nanometer film-installed fuel tank cap with charcoal canister according to claim 1, wherein said upper surface of said vent cap is comprised of a lower breathing panel covering said air gap, and wherein said fuel-adsorbing filler is set above said lower breathing panel.

8. The nanometer film-installed fuel tank cap with charcoal canister according to claim 1, further comprising: an upper breathing panel covering the top of said fuel-adsorbing filler, wherein said upper breathing panel is set at the upper port of said filling chamber.

9. The nanometer film-installed fuel tank cap with charcoal canister according to claim 1, further comprising: an inner deck covering the upper port of said filling chamber, wherein said inner deck is comprised of several upper vent holes.

10. The nanometer film-installed fuel tank cap with charcoal canister according to claim 1, wherein said fuel tank inner cap is installed at the bottom with a removable hook.

* * * * *